United States Patent
Krause et al.

(10) Patent No.: US 8,935,938 B2
(45) Date of Patent: Jan. 20, 2015

(54) WATER FILTER WITH MONITORING DEVICE AND REFRIGERATION APPLIANCE INCLUDING SAME

(75) Inventors: Andrew Reinhard Krause, LaGrange, KY (US); Russell James Fallon, Louisville, KY (US); Jason Andrew May, Prospect, KY (US)

(73) Assignee: General Electric Company, Schenectady, NY (US)

(*) Notice: Subject to any disclaimer, the term of this patent is extended or adjusted under 35 U.S.C. 154(b) by 331 days.

(21) Appl. No.: 13/115,625

(22) Filed: May 25, 2011

(65) Prior Publication Data

US 2012/0297817 A1 Nov. 29, 2012

(51) Int. Cl.
F25D 3/02 (2006.01)
F25D 15/00 (2006.01)
G01K 13/00 (2006.01)
F25D 23/12 (2006.01)
C02F 1/00 (2006.01)

(52) U.S. Cl.
CPC .............. *F25D 23/126* (2013.01); *C02F 1/001* (2013.01); *B01D 2201/4046* (2013.01); *B01D 2201/56* (2013.01); *C02F 2301/12* (2013.01); *F25D 2323/121* (2013.01)
USPC .................................. 62/318; 62/129; 62/331

(58) Field of Classification Search
CPC .............. B01D 35/30; B01D 2201/52; B01D 2201/56; B01D 2201/4023; B01D 2201/4046; B01D 2201/4061; F25D 2323/121; F25D 23/126; C02F 1/001; C02F 2307/12; G01B 11/002; G01B 11/2425; G06K 19/06009; G06K 19/06037; G06K 19/06103; Y10S 210/17
USPC .......... 62/129, 317, 318, 331; 210/85, 91, 94; 324/750.23; 340/815.5; 33/707; 356/620
See application file for complete search history.

(56) References Cited

U.S. PATENT DOCUMENTS

| | | | | |
|---|---|---|---|---|
| 4,622,457 A * | 11/1986 | Bradley et al. | ............ | 235/462.14 |
| 4,764,668 A * | 8/1988 | Hayard | ........................ | 235/470 |
| 4,794,238 A * | 12/1988 | Hampton | .................. | 235/462.32 |
| 5,192,424 A * | 3/1993 | Beyne et al. | ..................... | 210/85 |
| 5,580,444 A * | 12/1996 | Burrows | ........................ | 210/85 |
| 7,147,773 B2 * | 12/2006 | Mitchell et al. | ................ | 210/234 |
| 7,638,042 B2 | 12/2009 | Astle et al. | | |
| 7,703,382 B2 | 4/2010 | Oranski et al. | | |
| 8,277,644 B2 * | 10/2012 | Kim et al. | ........................ | 210/85 |
| 2003/0090682 A1 * | 5/2003 | Gooch et al. | .................. | 356/620 |
| 2004/0200947 A1 * | 10/2004 | Lau | .............................. | 250/202 |
| 2008/0060982 A1 * | 3/2008 | Krause et al. | .................... | 210/85 |
| 2008/0264092 A1 * | 10/2008 | Chase et al. | ..................... | 62/389 |
| 2008/0264842 A1 * | 10/2008 | Hukari et al. | .................. | 210/137 |
| 2010/0108591 A1 * | 5/2010 | Wieczorek et al. | ........... | 210/234 |

* cited by examiner

*Primary Examiner* — Mohammad M Ali
*Assistant Examiner* — Christopher R Zerphey
(74) *Attorney, Agent, or Firm* — Dority & Manning, PA

(57) ABSTRACT

An assembly for filtering water includes a housing, a water inlet for supplying unfiltered water to the housing, and a water filter including an outer casing attached to the housing in communication with the water inlet and a filter medium within the outer casing, the water filter filtering the unfiltered water through filter medium to provide filtered water. A water outlet is attached to the housing for transferring filtered water from the outer casing to a device via the housing. Some sort of indicia is located on the outer casing, and an optical device detects a feature of the indicia to determine if the water filter is properly installed in the housing. Related refrigeration appliances incorporating such devices are also disclosed.

17 Claims, 3 Drawing Sheets

WATER FILTER WITH MONITORING DEVICE AND REFRIGERATION APPLIANCE INCLUDING SAME

FIELD OF THE INVENTION

The subject matter disclosed herein relates generally to monitoring devices for water filters, such as those used in refrigeration appliances.

BACKGROUND OF THE INVENTION

Refrigeration appliances that have water or ice dispensers generally include a filter to remove impurities from the water supply before entering the refrigeration appliance equipment. Unfiltered water from a premises water source is typically fed via a filter inlet into a filter within the refrigeration appliance cabinet. The water is filtered within the filter and passed out of a filter outlet to whatever device is provided, such as an ice maker or a water dispenser.

As with most any such filtration system, as filtered particles are captured by the filter medium for a period of time, the filter should be cleaned and/or changed out. This period of time may vary dependent on the characteristics of the water provided based on the local water or treatment type, whether municipal or well water is employed, etc. In any event, periodically, the filter in such a refrigeration system should receive some attention from a user to maintain optimal performance.

It is important that the proper water filter be used with a given refrigeration device. For example, if the wrong filter is used, leakage may occur, insufficient filtration may occur, or system blockage may occur. Similarly, if a filter is misinstalled leakage or malfunctioning can occur. Therefore, a monitoring device that could determine that a proper filter device was in place, and/or was installed correctly, would be welcome.

BRIEF DESCRIPTION OF THE INVENTION

Aspects and advantages of the invention will be set forth in part in the following description, or may be obvious from the description, or may be learned through practice of the invention.

According to certain aspects of the disclosure, an assembly for filtering water includes a housing, a water inlet for supplying unfiltered water to the housing, and a water filter including an outer casing attached to the housing in communication with the water inlet and a filter medium within the outer casing, the water filter filtering the unfiltered water through filter medium to provide filtered water. A water outlet is attached to the housing for transferring filtered water from the outer casing to a device via the housing. Some sort of indicia is located on the outer casing, and an optical device detects a feature of the indicia to determine if the water filter is properly installed in the housing. Various options and modifications are possible.

According to certain other aspects of the disclosure a refrigeration appliance includes a refrigerated compartment having a door, a housing mounted within the refrigerated compartment, a water inlet for supplying unfiltered water to the housing, a water filter including an outer casing attached to the housing in communication with the water inlet and a filter medium within the outer casing, the water filter filtering the unfiltered water through filter medium to provide filtered water, and a water outlet attached to the housing for transferring filtered water from the outer casing to a device via the housing. Some sort of indicia is located on the outer casing, and an optical device detects a feature of the indicia to determine if the water filter is properly installed in the housing. As above, various options and modifications are possible.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
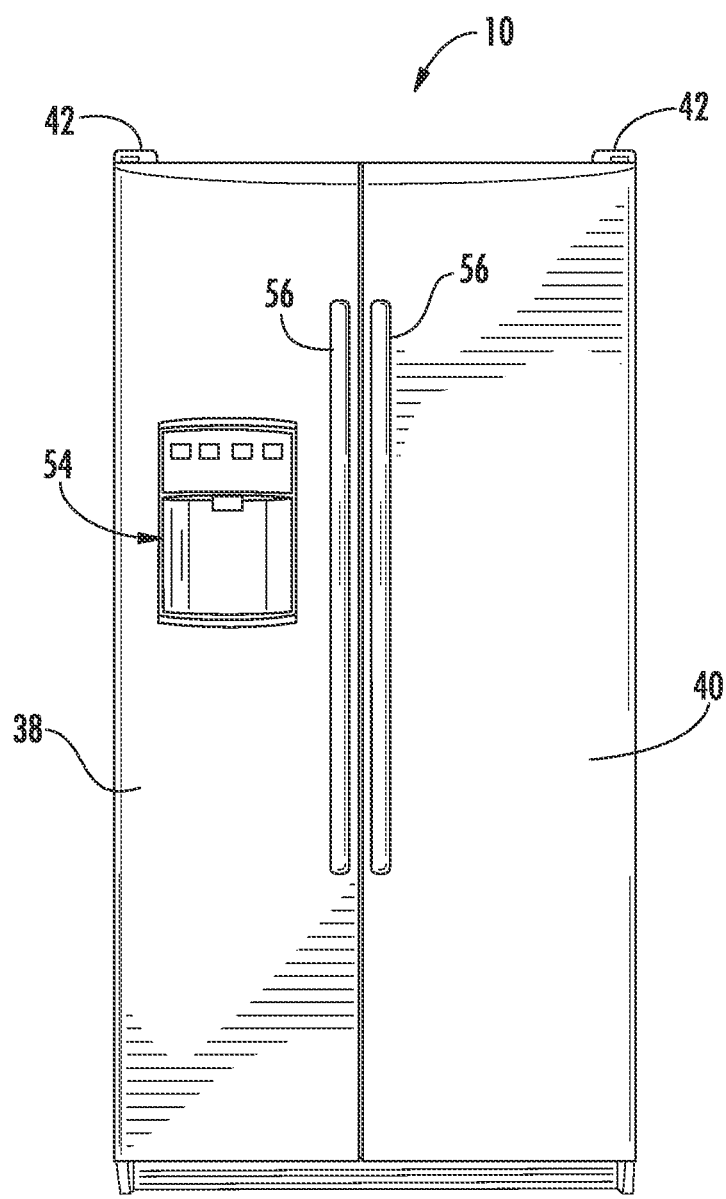
FIG. 1 provides a front view of a refrigeration appliance with its doors closed.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an exemplary refrigeration appliance 10 depicted as a refrigerator in which filter monitoring assemblies in accordance with aspects of the present invention may be utilized. It should be appreciated that the appliance of FIG. 1 is for illustrative purposes only and that the present invention is not limited to any particular type, style, or configuration of refrigeration appliance, and that such appliance may include any manner of refrigerator, freezer, refrigerator/freezer combination, and so forth.

Figure 2:
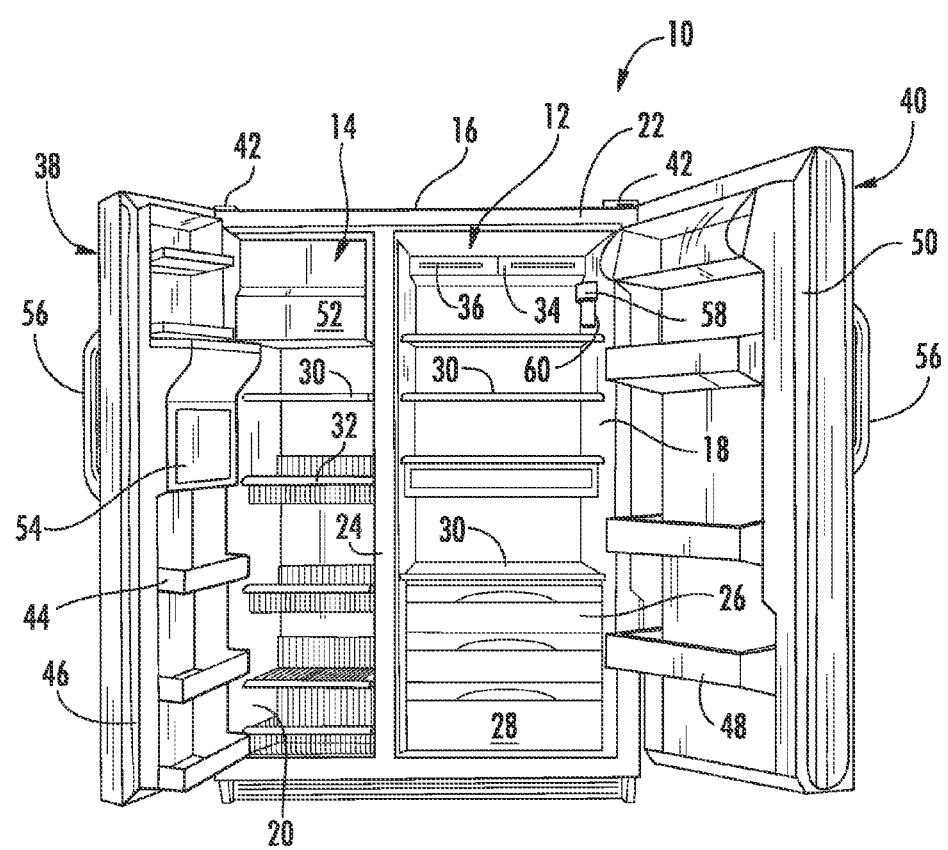
FIG. 2 provides a front view of the refrigeration appliance of FIG. 1 with its doors opened.

Referring to FIG. 2, the refrigerator 10 includes a fresh food storage compartment 12 and a freezer storage compartment 14, with the compartments arranged side-by-side and contained within an outer case 16 and inner liners 18 and 20 generally molded from a suitable plastic material. In smaller refrigerators 10, a single liner is formed and a mullion spans between opposite sides of the liner to divide it into a freezer storage compartment and a fresh food storage compartment. The outer case 16 is normally formed by folding a sheet of a suitable material, such as pre-painted steel, into an inverted U-shape to form top and side walls of the outer case 16. A bottom wall of the outer case 16 normally is formed separately and attached to the case side walls and to a bottom frame that provides support for refrigerator 10.

A breaker strip 22 extends between a case front flange and outer front edges of inner liners 18 and 20. The breaker strip 22 is formed from a suitable resilient material, such as an extruded acrylo-butadiene-styrene based material (commonly referred to as ABS). The insulation in the space between inner liners 18 and 20 is covered by another strip of suitable resilient material, which also commonly is referred to as a mullion 24 and may be formed of an extruded ABS material. Breaker strip 22 and mullion 24 form a front face, and extend completely around inner peripheral edges of the outer case 16 and vertically between inner liners 18 and 20.

Slide-out drawers 26, a storage bin 28 and shelves 30 are normally provided in fresh food storage compartment 12 to support items being stored therein. In addition, at least one shelf 30 and at least one wire basket 32 are also provided in freezer storage compartment 14.

The refrigerator features are controlled by a controller 34 according to user preference via manipulation of a control interface 36 mounted in an upper region of fresh food storage compartment 12 and coupled to the controller 34. As used herein, the term "controller" is not limited to just those integrated circuits referred to in the art as microprocessor, but broadly refers to computers, processors, microcontrollers, microcomputers, programmable logic controllers, application specific integrated circuits, and other programmable circuits, and these terms are used interchangeably herein.

A freezer door 38 and a fresh food door 40 close access openings to freezer storage compartment 14 and fresh food storage compartment 12. Each door 38, 40 is mounted by a top hinge 42 and a bottom hinge (not shown) to rotate about its outer vertical edge between an open position, as shown in FIG. 2, and a closed position as shown in FIG. 1. The freezer door 38 may include a plurality of storage shelves 44 and a sealing gasket 46, and fresh food door 40 also includes a plurality of storage shelves 48 and a sealing gasket 50.

The freezer storage compartment 14 may include an automatic ice maker 52 and a dispenser 54 provided in the freezer door 38 such that ice and/or chilled water can be dispensed without opening the freezer door 38, as is well known in the art. Doors 38 and 40 may be opened by handles 56 is conventional. A housing 58 may hold a water filter 60 used to filter water for the ice maker 52 and/or dispenser 54.

As with known refrigerators, the refrigerator 10 also includes a machinery compartment (not shown) that at least partially contains components for executing a known vapor compression cycle for cooling air. The components include a compressor, a condenser, an expansion device, and an evaporator connected in series as a loop and charged with a refrigerant. The evaporator is a type of heat exchanger which transfers heat from air passing over the evaporator to the refrigerant flowing through the evaporator, thereby causing the refrigerant to vaporize. The cooled air is used to refrigerate one or more refrigerator or freezer compartments via fans. Also, a cooling loop can be added to directly cool the ice maker to form ice cubes, and a heating loop can be added to help remove ice from the ice maker. Collectively, the vapor compression cycle components in a refrigeration circuit, associated fans, and associated compartments are conventionally referred to as a sealed system. The construction and operation of the sealed system are well known to those skilled in the art.

Figure 3:
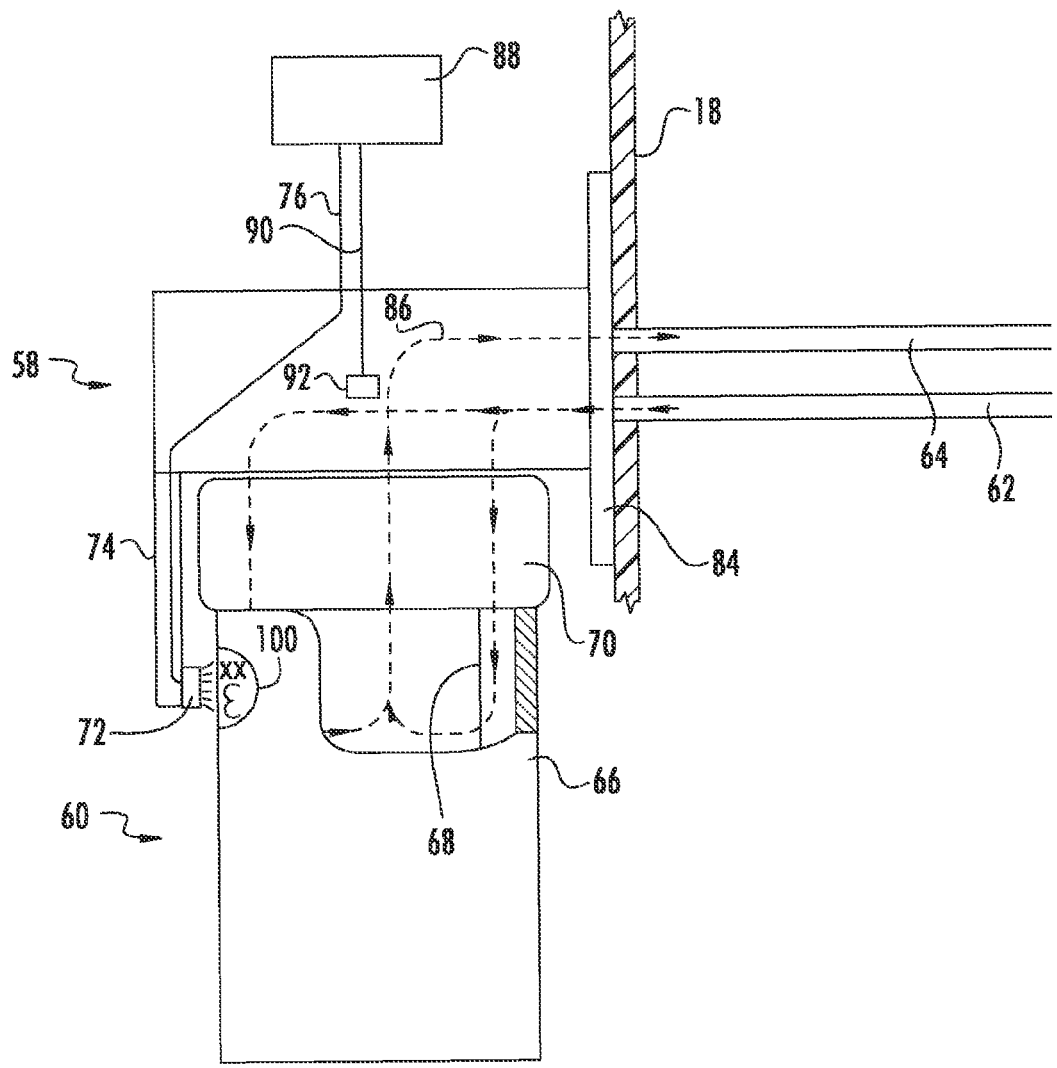
FIG. 3 provides a side view of a water filter (partially broken away) and monitoring device assembly suitable for use in a refrigeration appliance as in FIG. 1.

As shown in FIG. 3, a water filtering assembly may include a housing 58 attached to refrigeration appliance inner wall 18 via flange 84 and a water filter 60. However, it should be kept in mind that wall 18 could comprise any wall, whether in a refrigeration appliance or not, depending on the desired application. A water inlet 62 provides unfiltered water to housing 58 and a water outlet 64 removes filtered water from the housing to supply to a water using device, such as ice maker 52 within refrigeration appliance 10 or any other such device if installed elsewhere.

Water filter 60 includes an outer casing 66 and a conventional inner filter medium 68, which may comprise for example one or more of granular media such as activated carbon, membranes, etc., as desired. Outer casing 66 is attached to a conventional water filter cap 70 for attachment of water filter 60 to housing 58. A fluid path 88 is represented in dotted lines from inlet 62, though housing 58 and cap 70 into filter casing 66, though filter medium 68 and back out of casing 66 though cap 70 and housing 58. This path and function is conventional and housing 58 acts as a liquid manifold in the system. The filter may be reusable (i.e., cleanable) or single use, as desired.

An optical device 72 is provided for detecting a feature of indicia 100 to determine if 60 water filter is properly installed in housing 58. Optical device 72 may comprise a commercially available camera such as a black-and-white digital camera with an image sensor such as a Mitsubishi M64282FP CMOS, and an image sensor for example with a resolution of 123×128 pixels. However, various other optical recognition and sensor type cameras could be used. As shown, camera 72 is attached to a wall portion 74 of housing 58 adjacent outer casing 66, but the camera could be located elsewhere and/or spaced further from the outer casing than shown. For example, camera 72 could be located on inner liner 18 if desired, adjacent outer casing 66. Such location may be preferable to allow electronics and connections to be behind outer casing away from the refrigerated compartment.

If desired, a controller 88 may be used to selectively operate camera 72 and receive output signals from the camera and other input devices to achieve various functions. Controller 88 may be a separate integrated circuit board with on-board programmed chip(s) or the controller may be within main refrigeration appliance controller 34. Controller 88 may also be in communication 90 with one or more sensors 92. Connections may be wired or wireless if desired. Camera 72 may be operated by controller 88 continuously, intermittently, after occurrence of certain events, or in combinations of these modes.

Controller 88 may function in various ways based on the sensed feature of the indicia. For example, when water filter 60 is removed or not present, controller 88 may receive an indication signal of such from camera 72. If desired, potential removal of filter 60 could be sensed in some other way to cause controller 88 to activate camera 72 which would then provide a signal as to a feature of water filter 60, such as shape, presence, proper location, or proper filter. If camera 72 fails to sense that a proper filter is properly installed, a message can be sent to a user, for example, via a light, speaker, or LCD or other display on a front of refrigeration appliance 10. The message if on the display could include information as to the missing status of the filter, reordering information, model number, etc. Once a proper filter is properly installed, controller 88 could cause an indication to be sent to the user as to resetting of filter tracking data. That is, the light, speaker, display, etc. could indicate to the user that it was beginning to track usage of a new filter based on time in place and/or amount of water filtered, etc.

In terms of what camera 72 could detect and accordingly communicate to controller 88, various options are possible individually or in combination. For example, the feature detected could be a location of indicia 100 on water filter 60, so that proper installation of the water filter 60 can be determined. Therefore, if water filter 60 is, for example, not screwed in or attached in a proper orientation, camera 72 will not detect indicia 100 completely or properly. As such point an indication can be given to the user such as a speaker, an alarm, an illuminated signal light, a display indication, etc. Also, operation of the water system can be discontinued so that no further water is provided through inlet 62 until camera 72 detects the proper location of indicia 100 whether water filter 60 is entirely not present or just not fully installed properly.

Alternatively, the feature detected could be a graphical composition of indicia 100 indicating source of water filter 60 so that a proper match between the water filter and housing 58 (and accordingly the refrigeration appliance 10) can be determined. Therefore, as above, full operation and/or notification to the user can occur if camera 72 does not detect the desired feature of indicia 100. The feature could be, for example, graphical information such as name of supplier, model, a supplier trademark or logo, etc.

Also, the feature detected could be date information of indicia 100, so that a proper duration of use of water filter 60 can be determined. Such determination can be in combination with use of a clock device, present duration calculation, and/or a sensing of an amount of water passing through filter, as mentioned above. Therefore, if a water filter has a certain duty rating, after a period of time, an indication could be given to a user to remind the user to change or clean the filter. In such case, a sensor 92 or other sensor could comprise a mechanical, electrical or other sensor that senses when filter cap 70 is installed, and controller 88 can start measuring time from that point in combination with sensed indicia 100 by camera, or sensor 92 can sense an amount of water passing by to determine useful life of the filter.

Alternatively, the feature detected could be a shape of water filter 60 or a portion thereof. If an improper model of water filter, a feature of such filter present on the proper model would not be detected. Accordingly, the shape feature could be a flat portion, a raised portion, an indentation, pretty much any distinguishable shape detectable by camera 72 that would be in a location when proper water filter 60 is properly inserted.

In view of the above, an assembly for filtering water is provided wherein a monitoring device may detect features of indicia on the water filter to obtain information as to the filter. The system is initiated automatically upon installation of the water filter. Various modes and options are possible using camera device 72 and controller 88, and sensors such as sensor 92. Minimal change or addition to existing filter design is required.

It should also be understood that although this disclosure shows a filtration system used in a refrigeration appliance, the invention is not limited to such use. As set forth in the appended claims, the filtration system, the monitoring device function, etc., may also be employed on whole-house filters, under sink filters, etc. Therefore, the depiction of the filtration systems and discussion related to refrigeration appliances should not be limiting.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An assembly for filtering water, the assembly comprising:
    a housing;
    a water inlet for supplying unfiltered water to the housing;
    a water filter including an outer casing attached to the housing in communication with the water inlet and a filter medium within the outer casing, the water filter filtering the unfiltered water through filter medium to provide filtered water, the outer casing attached to the housing a rotationally and axially engaging attachment;
    a water outlet attached to the housing for transferring filtered water from the outer casing to a device via the housing;
    a graphical indicia located on a surface of a side of the outer casing; and
    an optical device positioned adjacent to the outer casing for detecting a feature of the graphical indicia to determine if the water filter is properly attached to the housing, wherein the feature includes a location of the graphical indicia, and wherein the optical device is positioned such that incomplete detection of the graphical indicia indicates the water filter is not properly attached to the housing.

2. The assembly of claim 1, wherein the assembly is configured to discontinue operation so that no further water is provided through the water inlet when the optical device determines the water filter is not properly attached to the housing.

3. The assembly of claim 1, wherein the feature detected includes date information of the graphical indicia, so that a proper duration of use of the water filter can be determined.

4. The assembly of claim 1, wherein the outer casing is attached to the housing a screw-type attachment.

5. The assembly of claim 1, wherein the optical device is a camera.

6. The assembly of claim 1, further including a controller in communication with the optical device to determine the proper installation has occurred.

7. The assembly of claim 1, wherein the housing is attachable to a refrigeration appliance.

8. A refrigeration appliance comprising:
    a refrigerated compartment having a door;
    a housing mounted within the refrigerated compartment;
    a water inlet for supplying unfiltered water to the housing;
    a water filter including an outer casing attached to the housing in communication with the water inlet and a filter medium within the outer casing, the water filter filtering the unfiltered water through filter medium to provide filtered water, the outer casing attached to the housing a rotationally and axially engaging attachment;
    a water outlet attached to the housing for transferring filtered water from the outer casing to a device via the housing;
    a graphical indicia located on a surface of a side of the outer casing; and
    an optical device positioned adjacent to the outer casing for detecting a feature of the indicia to determine if the water filter is properly attached to the housing, wherein the feature includes a location of the graphical indicia, and wherein the optical device is positioned such that incomplete detection of the graphical indicia indicates the water filter is not properly attached to the housing.

9. The refrigeration appliance of claim 8, further including a controller in communication with the optical device to determine the proper installation has occurred.

10. The refrigeration appliance of claim 9, wherein the optical device is a camera.

11. The refrigeration appliance of claim 10, wherein the assembly is configured to discontinue operation so that no further water is provided through the water inlet when the optical device determines the water filter is not properly attached to the housing.

12. The refrigeration appliance of claim 10, wherein the feature detected includes date information of the graphical indicia, so that a proper duration of use of the water filter can be determined.

13. The refrigeration appliance of claim 10, wherein the featured detected includes a shape of at least a portion of the outer casing.

14. An assembly for filtering water, the assembly comprising:
   a housing;
   a water inlet for supplying unfiltered water to the housing;
   a water filter including an outer casing in communication with the water inlet and a filter medium within the outer casing, the water filter filtering the unfiltered water through filter medium to provide filtered water, wherein the outer casing is attached to the housing a screw-type connection;
   a water outlet attached to the housing for transferring filtered water from the outer casing to a device via the housing;
   a graphical indicia located on a surface of a side of the outer casing; and
   an optical device positioned adjacent to the outer casing for detecting a feature of the indicia to determine if the water filter is properly screwed into the housing and attached to the housing in a proper orientation, wherein the feature includes a location of the graphical indicia, and wherein the optical device is positioned such that incomplete detection of the graphical indicia indicates the water filter is not properly attached to the housing.

15. The assembly of claim 14, wherein the optical device is rigidly attached to the housing.

16. The assembly of claim 14, wherein the housing further comprises a wall portion extending adjacent to the side of the outer casing, and wherein the optical device is attached to the wall portion of the housing.

17. The assembly of claim 14, wherein the assembly is configured to discontinue operation so that no further water is provided through the water inlet when the optical device determines the water filter is not properly screwed into the housing and attached to the housing in a proper orientation.

* * * * *